Sept. 10, 1963   P. G. THORNHILL   3,103,414
RECOVERY OF METALS FROM SOLUTIONS
Filed Feb. 25, 1960

FIG. 1

ORIGINAL SULFUR PARTICLE

FIG. 2

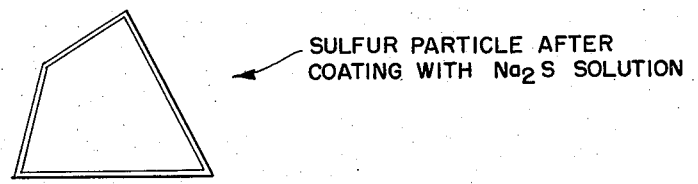

SULFUR PARTICLE AFTER COATING WITH $Na_2S$ SOLUTION

FIG. 3

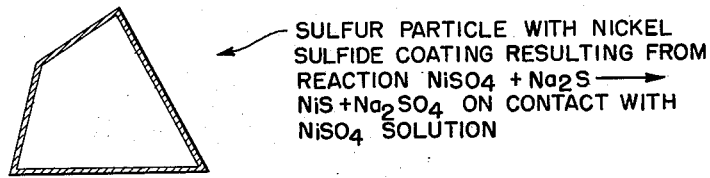

SULFUR PARTICLE WITH NICKEL SULFIDE COATING RESULTING FROM REACTION $NiSO_4 + Na_2S \longrightarrow NiS + Na_2SO_4$ ON CONTACT WITH $NiSO_4$ SOLUTION

FIG. 4

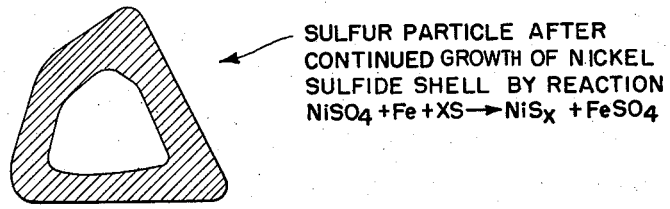

SULFUR PARTICLE AFTER CONTINUED GROWTH OF NICKEL SULFIDE SHELL BY REACTION $NiSO_4 + Fe + XS \longrightarrow NiS_x + FeSO_4$ INVENTOR
PHILIP G. THORNHILL
BY
Pennie, Edmonds, Morton, Barrows & Taylor
ATTORNEYS United States Patent Office 3,103,414
Patented Sept. 10, 1963

3,103,414
RECOVERY OF METALS FROM SOLUTIONS
Philip G. Thornhill, Richmond Hill, Ontario, Canada, assignor to Falconbridge Nickel Mines Limited, Toronto, Ontario, Canada, a corporation of Canada
Filed Feb. 25, 1960, Ser. No. 11,054
5 Claims. (Cl. 23—138)

This invention relates to the recovery of metals from solutions and has for its object more particularly improvements in the method of recovering such metals.

The invention relates more especially to the recovery of nickel and cobalt from hydrometallurgical solutions containing iron. Examples of such hydrometallurgical solutions are those obtained on water leaching of the calcines which result from the roasting of nickeliferous pyrrhotite as disclosed in U.S. Patent 2,813,016. Such solutions can carry considerable quantities of iron which, in the past, required separation from the solution before recovery of the non-ferrous metals could be effected. The separation of the iron from the solution was a tedious operation in that it involved oxidation of the iron, precipitation of the iron as ferric hydroxide, filtration of the ferric hydroxide and co-precipitates, and washing of the waste precipitates for recovery of occluded non-ferrous metals.

It is an object of the present invention to separate nickel and cobalt from hydrometallurgical leach solutions without first removing the contained iron from solution. In other words, the object is to recover from the solution the desired metals in the form of a substantially iron-free solid product, without first rendering the solution itself free from iron. A further object of the invention is to recover the nickel and cobalt from the solutions in an economic way, particularly with respect to reagent efficiency. Another object of the invention is to recover the metaliferous product in a form which is dense, easily filterable, and relatively free from contaminating materials.

It has been proposed to precipitate nickel from solutions by treatment of the solutions with iron sulphide and metallic iron, whereby the nickel dissolved in the solution combines with the sulphur of the iron sulphide, and the iron enters the solution in place of the nickel. It has also been proposed to effect a similar precipitation by the addition of elemental sulphur and metallic iron to the solutions, whereby reactions between the iron and sulphur result first in the production of iron sulphide, which along with excess metallic iron in turn reacts with the solutions to precipitate nickel as nickel sulphide. These methods are highly inefficient, requiring large excesses of precipitation reagents over theoretical amounts. Thus in the above examples, one involving the use of FeS and the other elemental sulphur, reagent requirements amounted respectively to about 95 and 35 times those indicated by the equation (1) $\quad FeS + NiSO_4 \rightarrow NiS + FeSO_4$ In view of these excesses, the disadvantages of these processes, not only in high reagent cost, but in contamination of the nickel sulphide product with unreacted reagents can be easily visualized by those skilled in the art.

The inefficiency of any procedure involving the reaction indicated by Equation 1 can be easily understood when the relatively negligible thermodynamic drive behind the reaction is taken into account. Thus, when the heat of reaction for Equation 1 is calculated, a value of less than 4 calories per gram mol is obtained. On the other hand, a heat of reaction amounting to more than 26 calories per gram mol is computed for the reaction

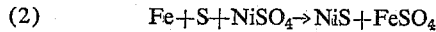
(2) $\quad Fe + S + NiSO_4 \rightarrow NiS + FeSO_4$

It is to be expected, then, that because of the correspondingly higher thermodynamic drive applying to reaction (2), the direct precipitation of nickel from aqueous solutions by elemental sulphur and metallic iron would result in higher efficiencies than obtained either when iron sulphide is employed directly, or when it appears as an intermediate product in the overall reaction expressed by Equation 2. In other words, higher efficiencies should be obtained if the available energy inherent in the elemental sulphur and metallic iron can be directed to the primary precipitation of nickel sulphide, instead of being first squandered on the formation of the undesired intermediate product, FeS.

As a result of my investigation, I have discovered that such disadvantages, and others, may be overcome and that certain advantages result from following my improvements. These are in part diagrammatically illustrated in the accompanying drawing, taken in conjunction with the following description, in which FIG. 1 is intended to show diagrammatically an original sulphur particle of random shape;

FIG. 2 shows the same sulphur particle coated with a layer of sodium sulphide ($Na_2S$) solution;

FIG. 3 shows the same sulphur particle with a solid nickel sulphide (NiS) coating resulting from a reaction between the sodium sulphide coating solution of FIG. 2 with a solution of nickel sulphate; and FIG. 4 shows the same sulphur particle after continued growth of the solid nickel sulphide coating resulting from the reaction of the nickel sulphate with iron and the sulphur.

I have found that elemental sulphur and metallic iron cna be made to effect a highly efficient precipitation of nickel and the small amounts of cobalt which usually accompany this metal from nickeliferous solutions, and that the precipitation can be made to occur by reaction of these two elements with the solution in such a way as to avoid the intermediate formation of iron sulphide, FeS. My method of achieving these ends is first to treat finely divided sulphur particles with a solution of an alkali metal sulphide, such as sodium sulphide. Each such sulphur particle is thus surrounded or coated by a film or layer of alkali metal sulphide solution, and when the thus coated sulphur is added with metallic iron to the nickeliferous solution, the alkali metal sulphide films react with the nickel sulphate in the solution according to Equation 3.

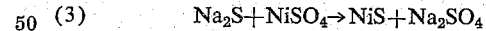
(3) $\quad Na_2S + NiSO_4 \rightarrow NiS + Na_2SO_4$

As indicated, the alkali metal sulphide films surrounding the sulphur particles are replaced by films of nickel sulphide. The nickel sulphide films have, in turn, a dual function. Firstly, they act as barriers between the sulphur surfaces and the metallic iron particles in the precipitating mixture, preventing direct reaction between these elements to form FeS. Secondly, they promote the precipitation of further amounts of nickel sulphide by providing the required surface nuclei of this compound. Thus, the sulphur and iron are encouraged to exert their free energy toward the direct precipitation of nickel as nickel sulphide; while dissipation of this energy in useless side reactions involving the formation of unwanted FeS is prevented.

The elemental sulphur and metallic iron have been found to act most effectively as precipitants for nickel in sulphate solutions which contain free acid, for example, solutions which have pH values ranging from about 1 to about 4. For this reason some excess of metallic iron over that equivalent to the precipitated nickel is required because of the side reactions with excess acid. Some excess of sulphur over its nickel equivalent is also necessary, depending upon the particle size of this reagent, and, hence, on its specific reacting surface. However, the range of acid content in the nickeliferous solution as noted above is not only desirable for efficient progress of the sulphur-iron precipitating reactions proper, but also for the initial formation of NiS films on the sulphur particles by reaction of the alkali sulphide with the dissolved nickel. This is especially true when the solutions contain iron, since the presence of acid prevents the co-precipitation of FeS with NiS during the formation of the nucleating films of nickel sulphide on the sulphur surfaces.

The metallic iron is best applied to the solution in the form of turnings or borings or in any other form in which it can be made to react with the solution. Scrap turnings or borings have the advantage of cheapness, and have sufficient surface area per unit of volume to permit relatively high treatment rates. In addition, they are convenient to handle, and can be mixed with solutions in tanks equipped with agitators of any conventional type. The agitation of the reacting mixture of sulphur, solution and iron need not be violent; all that is required is that the sulphur and sulphide products be maintained in suspension, the heavier iron particles remaining at, or near, the bottom of the tank. This procedure helps to avoid contamination of the sulphide precipitate with unreacted metallic iron, especially in a continuously operating system, in which it is possible continuously to withdraw precipitate from the top of the reaction vessel, leaving the bulk of the unreacted iron behind.

An example of the type of leach, or pregnant, solutions which can be advantageously treated in this way is that which is obtained upon water leaching of the calcines produced in accordance with the principles set forth in U.S. Patent 2,813,016, entitled "Fluidized Bed Roasting of Nickeliferous Sulphide Concentrates."

This solution analyses approximately as follows:

|  | Grams per litre |
|---|---|
| Ni | 15–20 |
| Cu | 2–3 |
| Co | 0.3–0.4 |
| $Fe^{+++}$ | 30–40 |
| $Fe^{++}$ | 5–10 |
| Na | 20–25 |

The solution also contains alkaline earth impurities and sufficient sulphuric acid to give a pH of from 1.0 to 1.5. All of the above metals occur in the form of sulphates.

In order that the full benefit of the present invention be realized, it is desirable, though not necessary, that the ferric iron in the solution be first reduced to the ferrous state, before proceeding with the precipitation. It is also important that the reduction be made to take place unaccompanied by any significant rise in the pH of the solution. Substantially complete reduction of the ferric ions can be achieved by treating the solution with finely divided pyrrhotite concentrate, for example, at a temperature of about 65° C. Separation of the pyrrhotite residue from the resulting mixture leaves a solution having a pH approximately equal to that obtained in the unreduced solution, while the iron of the solution so treated is substantially all reduced from the ferric to the ferrous state.

To demonstrate the principle of the present invention, the following experiment was performed. The ferric iron content of a nickeliferous solution obtained from the leaching of sulphate-roasted nickeliferous pyrrhotite was reduced to the ferrous state by treatment with about 200 grams of pyrrhotite concentrate in an agitated vessel held at a temperature of about 65° C. for a period of four hours. After separation of the pyrrhotite residue, reduction was found to have been effected in accordance with the data of Table I.

TABLE I

*Reduction of Ferric Iron in Leach Solution by Pyrrhotite*

|  | Analysis, g.p.l. | | | pH | Percent Reduction |
|---|---|---|---|---|---|
|  | Ni | $Fe^{+++}$ | $Fe^{++}$ | | |
| Solution before reduction | 17.8 | 30.1 | 5.1 | 1.1 | |
| Solution after reduction | 17.6 | 1.7 | 33.5 | 1.1 | 95.6 |

The reduced solution was divided into two volumes, each of 950 cc., designated No. 1 and No. 2. To each volume was added 35 grams scrap iron turnings, and 26.5 grams sulphur flour, and the resulting mixtures were maintained at a temperature of 70° C. under conditions of mild agitation for a period of 2.5 hours. The sulphur employed in the No. 1 mixture was first treated with a wetting agent only; that employed in the No. 2 mixture was first treated with a solution of the same wetting agent plus sodium sulphide, the latter material amounting to about 3% of the weight of the sulphur. At the end of the 2.5 hour reaction period, the solid precipitates were separated from their respective mixtures, to yield clear solutions. Chemical analyses of the precipitates and solutions plus wash resulted in the following data:

RESULT NO. 1 (SULPHUR TREATED WITH WETTING AGENT ONLY)

Precipitate:
  Weight _____ 64.3 grams.
  Analysis _____ 8.0% Ni, 11.3% Fe.
  Recovery _____ 27.4% of the nickel.
  Ni:Fe ratio _____ 0.71.
Solution—1200 cc. at 9.70 g.p.l. Ni.

RESULT NO. 2 (SULPHUR TREATED WITH WETTING AGENT+3% $Na_2S$)

Precipitate:
  Weight _____ 67.8 grams.
  Analysis _____ 20.4% Ni, 6.2% Fe.
  Recovery _____ 82.8% of the nickel.
  Ni:Fe ratio _____ 3.29.
Solution—1200 cc. at 2.44 g.p.l. Ni.

From the above data it can be calculated that reagent requirements in test No. 1 amounted to 12.0 grams of sulphur plus iron per gram of nickel precipitated, but that less than 4.5 grams of reagents were required per gram of nickel precipitated in test No. 2 in which the sulphur had been previously treated with sodium sulphide. It is also evident from the above data that the improved efficiency obtained in test No. 2 is due to the ability of the sodium sulphide to prevent the reaction between sulphur and iron, since the iron content of the test No. 2 precipitate is little more than half that of the precipitate resulting from test No. 1. The selectivity of the present invention in precipitating nickel vs. iron is, of course, even more marked when the nickel to iron ratios of the respective precipitates are compared.

The principles of the present invention readily lend themselves to practical operation on a continuous basis as demonstrated by the following example. Nickeliferous leach solution analyzing 20 g.p.l. Ni, 0.4 g.p.l. Co, 2.75 g.p.l. Cu, 35 g.p.l. $Fe^{+++}$, 7 g.p.l. $Fe^{++}$ and having a pH of 1.0 were continuously treated in a cascade of two agitated tanks with pyrrhotite having a screen analysis of about 85% −325 mesh. The feed rates of the solution and pyrrhotite were such that the resulting mixture had an overall residence time of about 2 hours, and the pyrrhotite to solution ratio was maintained at about 200 grams pyrrhotite per litre of solution. Treatment was conducted at a temperature of about 65° C. and the resulting slurry mixture was withdrawn from the second tank at the same rate as that at which the feed was introduced into the first tank. Continuous decantation of the solution from the slurry product resulted in a reduced solution analyzing 19.2 g.p.l. Ni, 0.38 g.p.l. Co, 2.6 g.p.l. Cu, 2.7 g.p.l. Fe$^{+++}$, 39 g.p.l. Fe$^{++}$ and having a pH of 1.0.

For treatment of the reduced solution, a slurry of sulphur was prepared by mixing in an agitated tank a quantity of sulphur flour having a screen analysis of 90% −200 mesh with an equivalent quantity of water (weight basis) and a wetting agent. A suitable wetting agent is one of the type known as "aromatic sulphonate." Such a wetting agent is known in the trade as Dispersanol SRS. The quantity of wetting agent employed was 0.025% of the weight of the sulphur, which was found sufficient to effect thorough blending with the water. Commercial flake (60%) sodium sulphide was then added to the mixture in the amount of about 5% of the contained sulphur. The sodium sulphide was permitted to dissolve in the liquid of slurry and mixing was continued to ensure that all sulphur particles would be coated with sodium sulphide solution.

The above reduced solution was continuously fed into a cascade of four mechanically agitated vessels, with simultaneous addition of the above described sulphur slurry and common cast iron borings at such a total rate as to result in an overall residence time of about 6 hours. Sulphur slurry was fed at such a rate that 1.0 gram sulphur accompanied 1 gram nickel entering with the reduced solution, and cast iron borings were fed at the rate of 2.0 grams borings per gram nickel. The temperature of the resulting mixture was maintained between 65° and 75° C., and the mixture was continuously withdrawn from the fourth vessel at a rate equivalent to the rate of input into the cascade. Continuous filtration of the mixture gave a filter cake which when washed free of barren solution gave a dry basis chemical analysis of 26.02% Ni, 6.6% Fe, 2.90% Cu and 0.52% Co. The barren solution filtrate was found to contain 0.37 gram per litre Ni, nil Cu and a trace of Co, indicating a nickel recovery from the solution of over 98%. This high rate of nickel recovery, plus the recovery of substantially all of the copper and cobalt in the original solution, was obtained with a reagent consumption of less than 3.1 grams sulphur plus iron per gram of nickel precipitated.

Microscopic examination of the precipitates in polished section reveals that the nickel occurs in the form of hard, dense shells of nickel sulphide enclosing kernels of unreacted sulphur. If the precipitates are subjected to a grinding operation, fresh surfaces of sulphur are exposed. Thus the precipitate after comminution can be used in place of fresh sulphur in the treatment of a second quantity of leach solution, with benefit both in quality of the finished precipitate and in economy of sulphur consumption.

Both the reduction and precipitation methods described in this specification can be carried out at temperatures outside of the ranges mentioned. However, the employment of lower temperatures has been found to necessitate inconveniently extended reaction periods, while temperatures much in excess of 75° C. do not increase reaction rates to a degree sufficient to warrant the additional trouble encountered by the consequent increase in vapor pressure of the solutions undergoing treatment. Similarly, the amount of alkali metal sulphide employed in pretreatment of the sulphur flour depends to a large extent on the amount of surface presented by the sulphur, and, therefore on the state of subdivision of this element.

It is believed that the mechanism whereby nickel sulphide-coated sulphur particles continue to react with nickel is analogous to that occurring in tarnishing reactions involving reaction between metals and sulphur vapour. Thus, just as the latter require that metal ions and electrons diffuse through a sulphide film, to react with sulphur at the outer surface of the film, the present process requires that nickel ions and electrons diffuse through the nickel sulphide film from its outer surface to its inner surface. Nickel ions are obtained from the solution, and electrons are obtained by the reaction $$Fe \rightarrow Fe^{++} + 2e$$

which occurs as the iron goes into solution. Each nickel ion in its passage through the nickel sulphide film (via cationic lattice vacancies) is accompanied by two electrons (via interstitial lattice positions), and on arrival at the sulphur-nickel sulphide interface take part in the reaction $$Ni^{++} + 2e + S \rightarrow NiS$$

As schematically represented in FIGS. 3–4, this mechanism involves the advance of the sulphide-sulphur interface toward the centre of the sulphur particle. Since the volume occupied by the nickel sulphide so formed is almost exactly equal to that of the sulphur consumed, distortion, and hence flaking, of the sulphide layer are at a minimum. This results in the formation of thick, dense layers of nickel sulphide, and thus provides a relatively coarse grained product which is easy to filter.

I claim:
1. In the method of precipitating nickel sulphide from a solution containing dissolved nickel values by the combined action of elemental sulphur particles and metallic iron, the improvement which comprises pretreating the sulphur particles with a solution of an alkali metal sulphide to coat their surfaces therewith, bringing the coated particles and metallic iron into contact with the nickeliferous solution to convert the soluble alkali metal sulphide coatings into insoluble nickel sulphide films by reaction with a minor portion of the dissolved nickel values, and using the nickel sulphide films as surface nuclei for the growth of further layers of nickel sulphide by reaction between the sulphur and the major portion of the dissolved nickel values, and as barriers to prevent reaction between the elemental sulphur and the metallic iron, thus permitting direct reaction of the iron with the solution without the intermediate formation of iron sulphide.

2. Method according to claim 1, in which the alkali metal sulphide is sodium sulphide.

3. Method according to claim 1, in which the sulphur particles are preliminarily wetted to facilitate coating contact with the alkali metal sulphide solution.

4. Method according to claim 1, in which the solution contains ferric iron, and the solution is brought into contact with iron sulphide for the reduction of the ferric iron to ferrous iron before precipitation of the nickel sulphide.

5. Method according to claim 4, in which the iron sulphide is pyrrhotite.

References Cited in the file of this patent

UNITED STATES PATENTS

| | | |
|---|---|---|
| 78,001 | Monnier | May 19, 1868 |
| 2,349,223 | Hedley et al. | May 16, 1944 |
| 2,651,562 | De Merre | Sept. 8, 1953 |
| 2,671,712 | De Merre | Mar. 9, 1954 |
| 2,755,172 | McGauley | July 17, 1956 |
| 2,803,537 | De Merre | Aug. 20, 1957 |